US005508520A

United States Patent [19]

Shoji et al.

[11] Patent Number: 5,508,520

[45] Date of Patent: Apr. 16, 1996

[54] METHOD AND APPARATUS FOR DISCRIMINATING PRINTINGS

[75] Inventors: Hisashi Shoji, Kawasaki; Morio Onoe, Tokyo; Tadashi Saito, Yokohama; Takeshi Takemoto, Yamato; Takashi Kimura, Yokohama, all of Japan

[73] Assignee: Ricoh Company, Ltd., Tokyo, Japan

[21] Appl. No.: 233,344

[22] Filed: Apr. 26, 1994

[30] Foreign Application Priority Data

| | | | |
|---|---|---|---|
| Apr. 27, 1993 | [JP] | Japan | 5-101291 |
| Jun. 8, 1993 | [JP] | Japan | 5-137959 |
| Jul. 28, 1993 | [JP] | Japan | 5-186231 |

[51] Int. Cl.[6] .............................. G01N 21/00; B32B 3/00

[52] U.S. Cl. ......................... 250/559.4; 250/271; 428/195

[58] Field of Search ............................ 250/559.4, 559.44, 250/271, 559.45, 556; 430/130; 428/195; 355/311

[56] References Cited

U.S. PATENT DOCUMENTS

| | | | |
|---|---|---|---|
| 4,533,244 | 8/1985 | Kaule et al. | 250/271 |
| 5,146,087 | 9/1992 | Van Dusen | 250/223 R |
| 5,151,595 | 9/1992 | Filo | 250/271 |
| 5,312,797 | 5/1994 | Takiguchi et al. | 428/195 |
| 5,397,763 | 5/1995 | Fujimura et al. | 428/195 |

*Primary Examiner*—Stephone B. Allen

*Attorney, Agent, or Firm*—Oblon, Spivak, McClelland, Maier & Neustadt

[57] ABSTRACT

In a method and an apparatus for discriminating real securities from copies thereof produced by an electrophotographic copier using a toner, a heating member heated to a temperature above 50° C. and below 250° C. is brought into contact with a printing to see if an image on the printing changes or if any deposit is present on the heating member. Whether or not the image of the printing is formed by a toner whose major component is a thermoplastic resin, is determined on the basis of the result of the above decision.

45 Claims, 14 Drawing Sheets

METHOD AND APPARATUS FOR DISCRIMINATING PRINTINGS

BACKGROUND OF THE INVENTION

The present invention relates to a method and an apparatus capable of discriminating surely and easily various kinds of real printings, including bills, coupons, stamps, tickets and other securities, from formed ones produced by an electrophotographic copier using a toner.

The problem with advanced color copiers available today is that they allow even securities, including bills and coupons, to be forged with ease. Regarding image quality, such forged securities, or copies, are comparable with real securities. Among color copiers, a dry process electrophotographic color copier is often used for the forging purpose since it is operable at high speed and low cost while implementing recording on plain papers. In light of this, there is an increasing demand for an effective measure against the illegal use of forged securities and other printings.

To identify printings, some different methods have been proposed in the past. One of them consists in sensing the density of a particular portion of a printing and determining whether or not it lies in a predetermined range. This kind of scheme is disclosed in, for example, Japanese Patent Publication No. 52-27982. Another conventional method reads a number of data patterns from a printing in a scanning direction and compares them with respective model patterns, as taught in Japanese Patent Laid-Open Publication No. 55-9284. Alternatively, a deviation of a read value from a mean value may be compared with a reference, as proposed in Japanese Patent Publication No. 61-8478.

All the conventional methods for identification need values read from reference images (e.g. bills). In practice, however, a great number of securities which need identification are circulated throughout the world. Since storing all patterns representative of such a number of securities in a memory is impracticable, the kinds of securities to be identified should be limited. Moreover, an apparatus for implementing the identification of securities is complicated and expensive since it needs optical scanning means, positioning means, means for storing reference data, comparing means, etc.

SUMMARY OF THE INVENTION

It is, therefore, an object of the present invention to provide a method capable of surely determining whether or not a printing is produced by an electrophotographic copier using a toner whose major component is a thermoplastic resin, without regard to the kind of the printing, and an apparatus therefor.

It is another object of the present invention to provide a portable printing discriminating apparatus which is simple and easy to carry.

In accordance with the present invention, a method of determining whether or not an image printed on a printing is formed by a coloring agent whose major component is a thermoplastic resin comprises the steps of heating the printing at a predetermined temperature, detecting a change in the printing, and determining, based on the detected change of the printing, whether or not the image of the printing is formed by the above-mentioned coloring agent.

Also, in accordance with the present invention, an apparatus for determining whether or not an image printed on a printing is formed by a coloring agent whose major component is a thermoplastic resin comprises a heater for heating the printing at a predetermined temperature, a device for detecting a change in the printing heated by the heater, and a decision circuit for determining, based on the change in the printing, whether or not the image of the printing is formed by the above-mentioned coloring agent.

Further, in accodance with the present invention, an apparatus for determining whether or not an image printed on a printing is formed by a coloring agent whose major component is a thermoplastic resin comprises a portable casing, a heating member mounted on the surface of the casing, a control circuit built in the casing for controlling the surface temperature of the heating member to a predetermined temperature, a switch for selectively turning on or turning off power supply to the control circuit, and a presser for pressing the printing against the surface of the heating member. The presser presses the printing against the surface of the heating member to heat the printing to thereby determine at least one of a change in the printing and whether or not a deposit come off the printing and deposited on the heating member is present, and whether or not the image of the printing is formed by the above-mentioned coloring agent is determined on the basis of the result of the above decision.

Moreover, in accordance with the present invention, an apparatus for determining whether or not an image printed on a printing is formed by a coloring agent whose major component is a thermoplastic resin comprises a unit capable of being combined with a cash register or similar equipment, a heating member mounted on one surface of the unit, a control circuit built in the unit for controlling the surface temperature of the heating member to a predetermined temperature, a switch for selectively turning on or turning off power supply to the control circuit, and a presser for pressing the printing against the surface of the heating member. The pressing member presses the printing against the surface of the heating member to heat the printing to thereby determine at least one of a change in the printing and whether or not a deposit come off the printing and deposited on the heating member is present, and whether or not the image of the printing is formed by the above-mentioned coloring agent is determined on the basis of the result of the above decision.

In addition, in accordance with the present invention, an apparatus for determining whether or not an image printed on a printing is formed by a coloring agent whose major component is a thermoplastic resin comprises a tubular portable casing, a heating member affixed to one end of the casing such that the surface of the heating member appears at the end of the casing, a control circuit built in the casing for controlling the surface temperature of the heating member to a predetermined temperature, and a switch for selectively turning on or turning off power supply to the control circuit. The printing is pressed against and heated by the surface of the heating member to thereby determine at least one of a change in the printing and whether or not a deposit come off the printing and deposited on the heating member is present, and whether or not the image of the printing is formed by the above-mentioned coloring agent is determined on the basis of the result of the above decision.

BRIEF DESCRIPTION OF THE DRAWINGS

The above and other objects, features and advantages of the present invention will become more apparent from the following detailed description taken with the accompanying drawings in which:

FIG. 7C is a section along line 7E—7E of FIG. 7C;

DESCRIPTION OF THE PREFERRED EMBODIMENTS

Figure 1A:
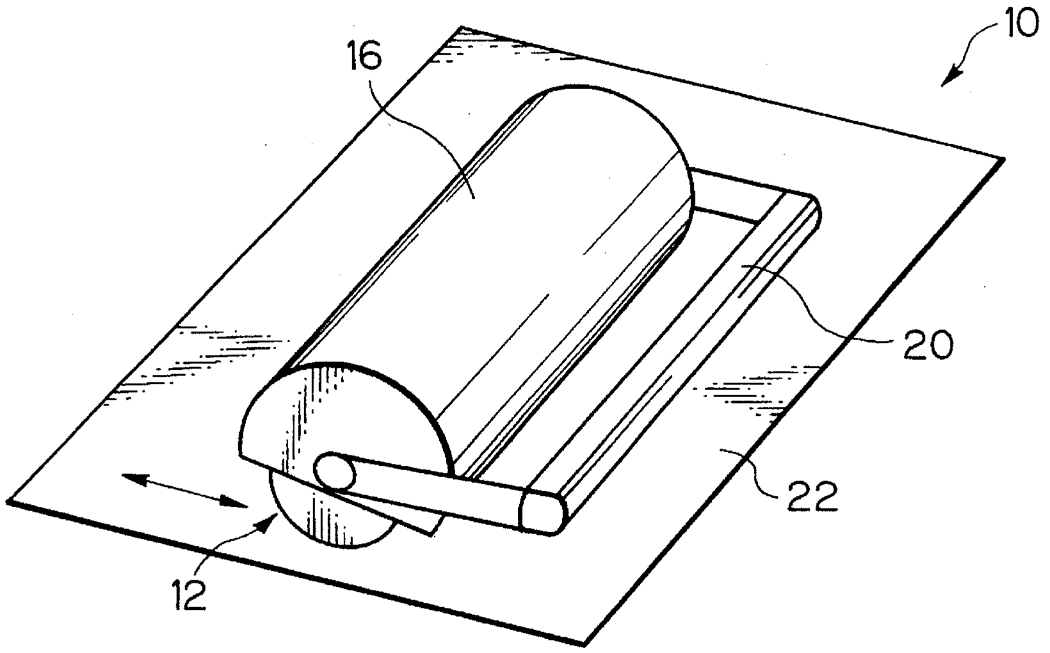
FIG. 1A is a perspective view of a first embodiment of the printing discriminating apparatus in accordance with the present invention.

To better understand the present invention, the principle of image formation using an electrophotographic procedure will be described. A photoconductive element for use in, for example, a copier is implemented as a drum or a belt having an electrode, which is mainly made of metal, and an organic or inorganic photoconductive layer provided on the electrode. An electrophotographic image forming process using such a photoconductive element includes the following steps:

(a) charging the surface of the element to about 500 V to 1500 V in absolute value (charging step);

(b) exposing the charged surface to light reflected from or transmitted through a document or to an imagewise pattern emitted from a laser or an LED (Light Emitting Diode), so that the potential of the illuminated portion is lowered to form an electrostatic latent image (exposing step);

(c) developing the latent image by a toner, i.e., charged particles consisting of a thermoplastic resin and a coloring agent (developing step);

(d) transferring the resulting toner image electrostatically to a plain paper or similar recording medium (transferring step); and (e) fixing the toner image on the medium by heat and pressure, thereby producing a recording (fixing step).

Two different methods are available for forming a color image, as follows. One method consists in repeating the process for forming a toner image on the photoconductive element for each color to thereby form a composite multicolor image, transferring the composite image to a recording medium, and then fixing the toner image on the medium. The other method consists in repeating the transfer of a toner image to a recording medium color by color to thereby sequentially form a multicolor image, and then fixing the image on the medium. An apparatus using any of such methods may have a single optics shared by all the colors in order to implement a compact configuration or may have exclusive optics for respective colors in order to implement high speed operation.

The two methods stated above use the same scheme for fixation. While various fixing methods have been proposed in the past, a method using a heat roller and a pressure roller and passing a recording medium with a toner image through between them is predominant since it simplifies an apparatus and promotes safety operation. Specifically, when a recording medium arrives at a position where the two rollers contact, the toner and the medium itself are heated with the result that the toner is half-melted and coupled to the fibers of a paper or the irregularities of a sheet having a substantial area by the pressure. As the medium leaves the rollers, it is cooled off and allows the toner to solidify. The temperature of the heat roller should preferably be as low as possible from the energy efficiency and safety standpoint. Regarding a color image, it is necessary to render the surface of a toner image smooth and to set up a uniform toner distribution within the image, thereby enhancing color reproducibility. In light of this, the apparatus and materials are so designed as to increase the melting degree of the toner while eliminating offsets toward the heat roller. Further, silicone oil or similar parting agent is often applied to the heat roller to obviate offsets, i.e., to reduce the adhering force at the interface.

A toner mainly consists of a thermoplastic resin and contains a pigment, dye or similar coloring agent and a charge control agent. The thermal characteristic of the thermoplastic resin is selected in consideration of adaptability to the fixing process as well as preservability. The word "preservability" refers to preventing the toner from cohering during storage at the inside or outside of a copier or during transport. For preservability, glass transition temperature should be higher than 50°. On the other hand, a toner for color images should have a low softening point in order to meet the above-stated demands relating to fixation. Other requirements with a thermoplastic resin are that it be transparent for enhancing color reproducibility, and that it be provided with an adequate charging characteristic and resistance in respect of developing and transferring steps. Polyester resin and styrene-methacrylic acid butyl copolymer are often used since they satisfy the above conditions. Other substances replacing them are polystyrene, styrene-acryl copolymer, epoxy, polyamide, polymethyl methacrylate, and polyvinyl butyral. Most of commercially available products have fixing temperatures of 150° C. to 220° C.

The present invention is based on an offset which is a phenomenon particular to the heat roller fixation scheme.

Assume that a member in the form of a roller, sheet or block (e.g. stamp) and heated to above 50° C., but below 250° C., is brought into contact with a printing. Then, if the image on the printing is formed by a toner whose major component is a thermoplastic resin, it will partly melt due to heat and adhere to the member to be removed thereby. By contrast, if the image is constituted by ink customary with an ordinary printing process, it will not undergo such a change in spite of heat. It follows that by bringing a roller, sheet, stamp or similar member into contact with a printing and then determining the presence/absence of deposits on the member or a change in the printing (e.g. change in density), it is possible to determine whether the coloring agent is ink or whether it is a toner containing a thermoplastic resin.

The prerequisite with the roller, sheet, stamp or similar member to contact a toner is that it has high surface energy. This requisite is met when use is made of, for example, polyester, polycarbonate, polymethyl metacrylate, polyvinyl chloride, FRP, ABS resin or similar polymer, or aluminum, stainless steel or similar metal. Fluoric resin, silicone resin, and polyethyrene are undesirable since their parting ability is too great to cause a half-melted toner to adhere. Such a member may be provided with a smooth surface or with an irregular surface which will enhance the adhering force.

Preferred embodiments of the present invention will be described with reference to the accompanying drawings.

1st Embodiment

Figure 1B:
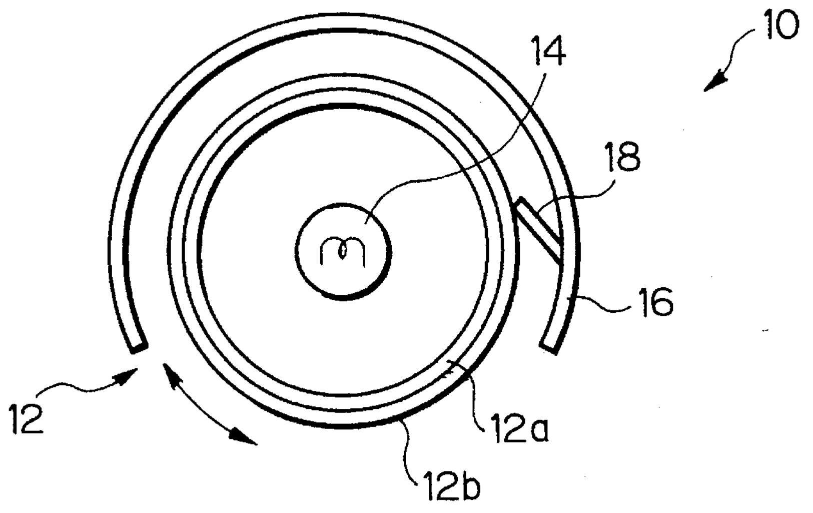
FIG. 1B is a section of the embodiment.

Referring to FIGS. 1A–1D, a printing discriminating apparatus embodying the present invention is shown and generally designated by the reference numeral 10. As shown, the apparatus 10 is generally made up of a roller 12, a cover 16, a roller cleaner 18, and a handle 20. The roller 12 has a heater, or heat source, 14 thereinside. The roller cleaner 18 is implemented by, for example, an elastic blade and removes deposits from the surface of the roller 12. The roller 12 is constituted by a cylindrical aluminum core **12*a*, and a polyester resin layer 12*b* formed on the surface of the core 12*a*. The roller 12 rolls in opposite directions, as indicated by a double-headed arrow in the figure, when lightly pushed. In the illustrative embodiment, the heater 14 is implemented by a halogen lamp. The surface temperature of the roller 12 is controlled to a range of from 50° C. to 250° C. The handle 20 supports the cover 26 and the shaft of the roller 12. As shown in FIG. 1B, a person can move the roller 12 on a printing 22 by holding the handle 20**.

As the roller 12 rolls on the printing 22, the surface temperature of the printing 22 rises due to the heat of the roller 12. Then, if the coloring agent forming an image on the printing 22 is ink, it does not change. However, when the coloring agent is a toner, it melts with the result that an adhering force acts between the printing 22 and the roller 12. Hence, when the roller 12 leaves the image on the printing 22, the toner comes off the base (paper) of the printing 22. By observing such a change, it is possible to identify the toner on the printing 22. The toner melted and deposited on the roller 22 is removed by the roller cleaner 18. A shutter, not shown, is provided on the cover 16 and closed when the apparatus 10 is not used, thereby obviating accidents attributable to heat. Preferably, the shutter should be automatically opened when a button or a lever is operated.

It is to be noted that surface temperatures of the roller 22 lower than 50° C. would prevent a toner from melting while surface temperatures higher than 250° C. would deform and damage the base or paper of the printing 22.

Figure 1C:
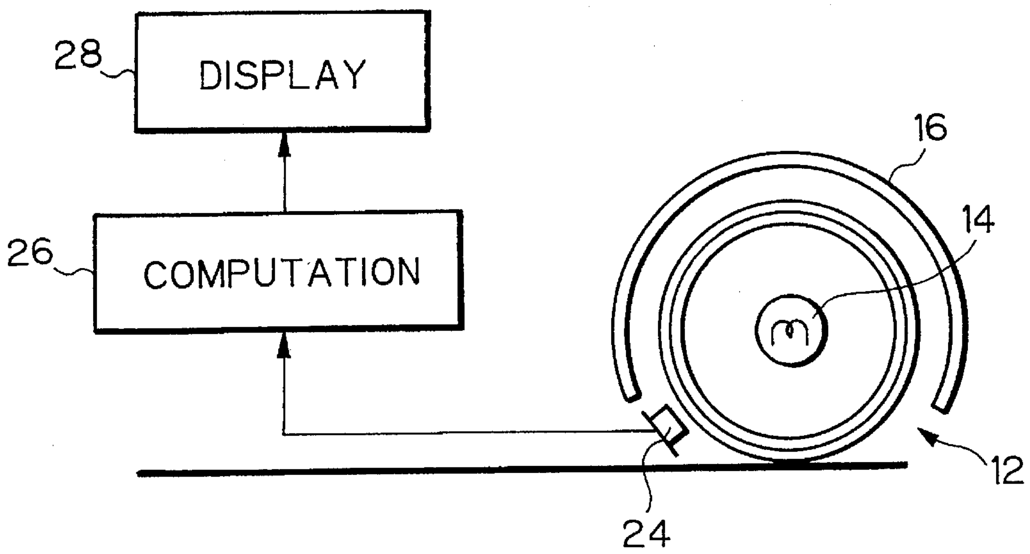
FIGS. 1C and 1D each shows a modification of the embodiment.

FIG. 1C shows a specific arrangement for detecting deposits on the roller 12 to thereby identify the printing 22 automatically. As shown, the arrangement includes a density sensor 24 responsive to the reflection density of the surface of the roller 12, a computation 26 for determining, in response to the reflection density measured by the density sensor 24 or a change thereof, whether or not deposits are present on the roller 12, and a display 28 for displaying the result of decision. If desired, the density sensor 24 may be replaced with means for sensing irregularities on the surface of the roller 12.

Figure 1D:
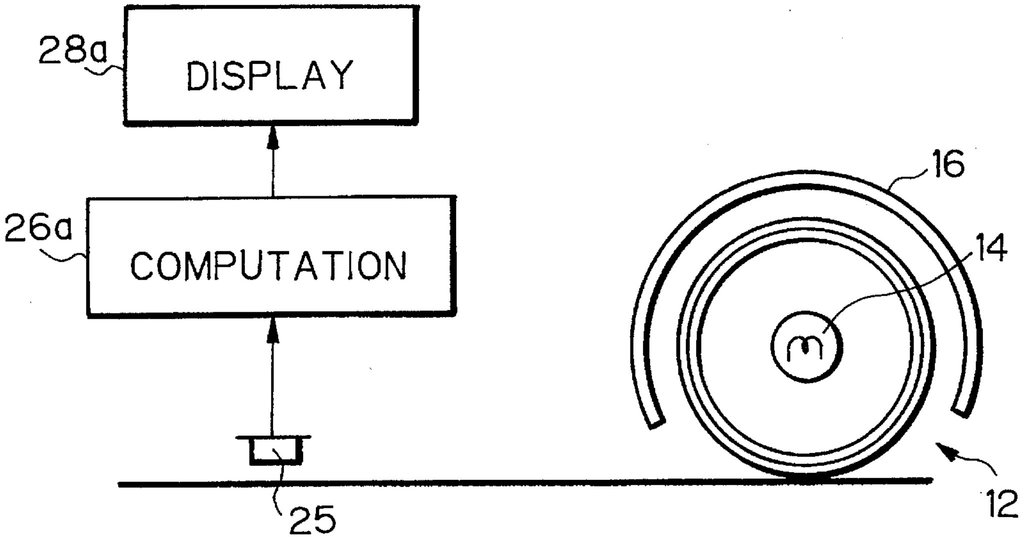

FIG. 1D shows another specific arrangement which detects the density or color of the printing 22 for the automatic identification. As shown, the arrangement includes a density sensor 25 for sensing the density of the printing 22 after the roller 12 has moved away from the printing 22, a computation **26*a* for detecting a change in the printing 22 in response to the output of the sensor 25, and a display 28*a*** for displaying the result of discrimination.

2nd Embodiment

Figure 2A:
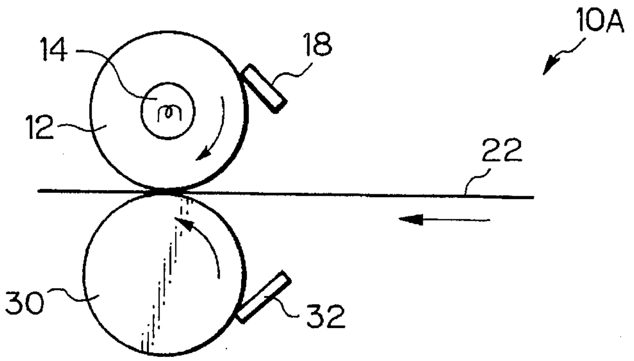
FIG. 2A is a section showing a second embodiment of the present invention.

Referring to FIG. 2A, a second embodiment of the present invention will be described. In the figure, the same or similar constituent parts as or to the parts of FIGS. 1A–1D are designated by the same reference numerals, and a detailed description will not be made in order to avoid redundancy. As shown, a discriminating apparatus, generally 10A, has a heat roller 12, a press roller 30, a heat roller cleaner 18, and a press roller cleaner 32. The rollers 12 and 30 each has a cylindrical aluminum core and a rubber or plastic layer, to which a toner is easy adhere, provided on the core, although not shown specifically. A drive force is imparted to one or both of the rollers 12 and 30. The heater 14 disposed in the heat roller 12 is implemented by a halogen lamp and controlled to heat the surface of the roller 12 to a temperature ranging from 100° C. to 250° C. The printing 22 is conveyed through between the rollers 12 and 30 while being pressed and heated.

While the printing 22 is moved through between the rollers 12 and 30, the roller 12 heats it with the result that the surface temperature of the printing 22 rises. As a result, if the coloring agent of the printing 22 is a toner, it melts, as in the first embodiment. Hence, when the roller 12 leaves the printing 22, the toner comes off the base or paper of the printing 22 due to an adhering force. By observing such a change, it is possible to identify the printing 22 implemented by a toner. The toner deposited on the heat roller 12 is removed by the heat roller cleaner 18. When the printing 22 carries an image formed by a toner on the other side also, the toner deposits on the press roller 30. The press roller cleaner 32 removes the toner deposited on the press roller 30. To promote this removal, a heater should preferably be disposed in the press roller 30 in the same manner as in the heat roller 12.

Figure 2B:
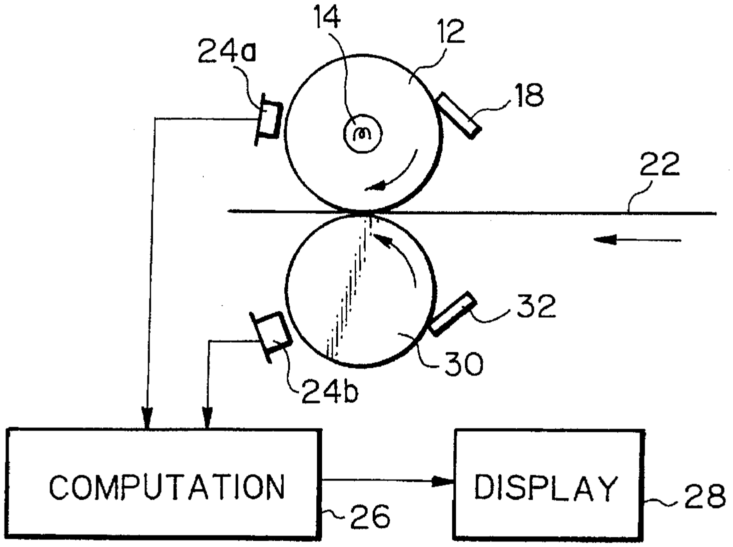
FIGS. 2B and 2C each shows a modification of the second embodiment.

A specific arrangement for the automatic identification of the printing is shown in FIG. 2B which detects deposits on the surfaces of the heat roller 12 and press roller 30. As shown, the arrangement includes, in addition to the constituents of FIG. 2A, density sensors **24*a* and 24*b* for measuring the reflection densities of the rollers 12 and 30, respectively, a computation 26 responsive to the outputs of the sensors 24*a* and 24*b* for determining whether or not deposits are present, and a display 28 for displaying the result of decision. If desired, the density sensors 24*a* and 24*b* may be replaced with means for sensing irregularities on the surfaces of the rollers 12 and 30**.

Figure 2C:
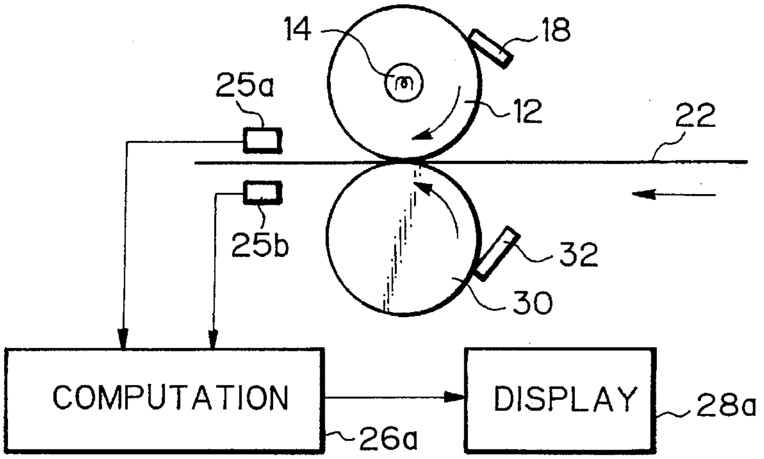

FIG. 2C shows another specific arrangement which is constructed to detect a change in the density or color of the printing 22. As shown, the arrangement includes, in addition to the constituents of FIG. 2A, density sensors 25*a* and 25*b* for sensing the density of the printing 22 after the rollers 12 and 30 have moved away, a computation 26*a* for determining a change in the printing in response to the sensed densities or changes thereof, and a display 28*a* for displaying the result of decision.

If desired, one or both of the heat roller 12 and press roller 30 may be implemented as a belt.

3rd Embodiment

This embodiment identifies a printing with a toner automatically based on the fact that as a toner deposits on the surface of a heat roller, a printing carrying it sequentially wraps around the roller.

Figure 3A:
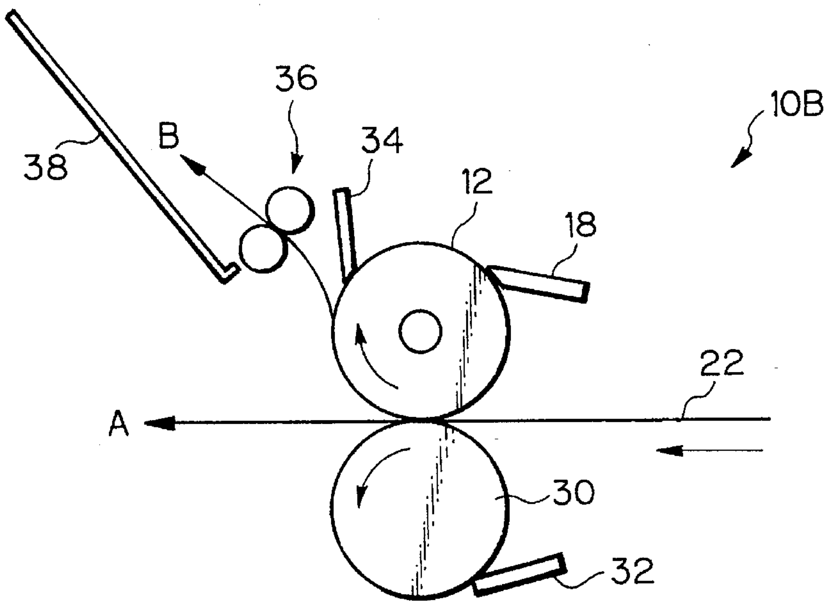
FIG. 3A is a section showing a third embodiment of the present invention.

As shown in FIG. 3A, an identifying apparatus 10B has, in addition to the previously stated basic arrangement, a separator 34 and a tray 38 on the side where the heat roller 12 is positioned. When the printing 22 moving through between the two rollers 12 and 30 is a real bill, it is simply conveyed in a direction A without adhering to the roller 12. However, when the printing 22 is a forged bill, i.e., a copy produced by a color copier, a toner on the printing 22 adheres to the surface of the heat roller 12 with the result that the printing 22 sequentially wraps around the roller 12. Then, the separator 34 separates the printing 22 from the heat roller 12. A conveyor roller pair 36 conveys the separated printing 22 to the tray 38, as indicated by an arrow B in the figure. This is successful in identifying printings implemented by a toner.

Figure 3B:
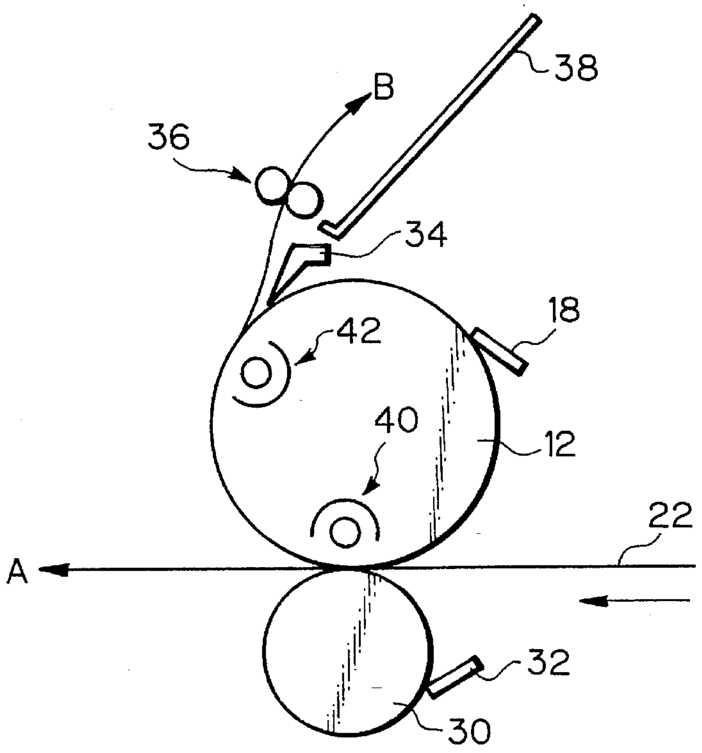
FIG. 3B is a section showing a modification of the third embodiment.

Assume that a toner is fixed at a temperature lower than the range of from 150° C. to 250° C., e.g., at 100° C. Then, the printing 22 strongly adheres to the heat roller 12 and rotates together with the roller 12 (so-called cold offset). For this reason, with the apparatus shown in FIG. 10B, it is likely that the printing 22 wrapped around the heat roller 12 is prevented from separating from the roller 12 easily. In light of this, as shown in FIG. 3B, means may be additionally provided for removing the printing 22 wrapped around the heat roller 12. Specifically, in FIG. 3B, a first and a second heating member 40 and 42, respectively are disposed in the heat roller 12. After the first heating member 40 has caused the printing 22 implemented by a toner to adhere to the surface of the heat roller 12, the second heating member again heats the printing to the fixing temperature of the toner ranging from 150° C. to 220° C. This allows the printing 22 to separate from the heat roller 12 easily.

4th Embodiment

Briefly, this embodiment lays the printing 22 on a sheet, moves them through between the heat roller and the press roller, separates the printing 22 from the sheet, and then determines whether or not deposits are present on the sheet or reads a change in the density of the printing 22.

Figure 4A:
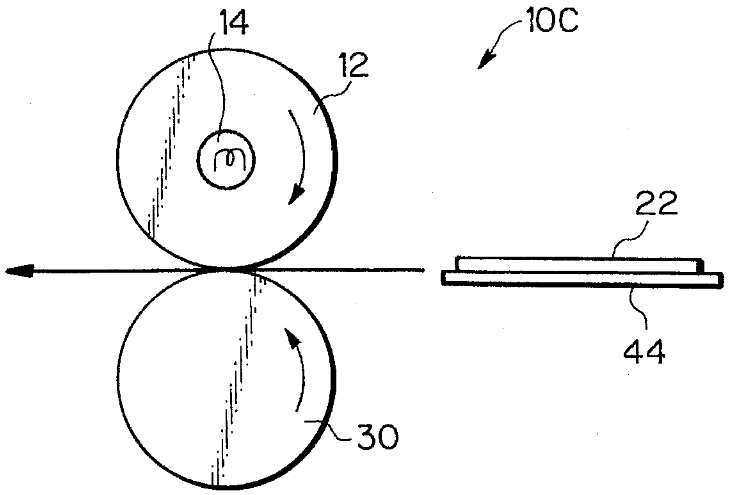
FIG. 4A is a section showing a fourth embodiment of the present invention.

As shown in FIG. 4A, a discriminating apparatus 10C also has the heat roller 12 accommodating the heater 14 therein, and the press roller 30. The rollers 12 and 30 each has a cylindrical aluminum core with or without rubber or plastic layer covering the core. A drive force is imparted to one or both of the rollers 12 and 30. The heater or halogen lamp 14 heats the surface of the heat roller 12 to a temperature ranging from 100° C. to 250° C. The printing 22 is laid on a single sheet 44 (or held between two sheets 44) and then conveyed through between the heat roller 12 and the press roller 30 while being heated and pressed. The sheet 44 should be adhesive to the melted toner and may advantageously be implemented by any one of the previously mentioned polymers. In addition, the surface of the sheet 44 should preferably be irregular, rather than smooth.

As the printing 22 and sheet 4 are moved through between the two rollers 12 and 30, the surface temperature of the printing 22 rises due to the heat of the roller 12. As a result, if the coloring agent of the printing 22 is a toner, it melts and causes an adhering force to act between it and the surface of the sheet 44. After the printing 22 and sheet 4 have moved away from the rollers 12 and 30, the sheet 44 is removed from the printing 22. Then, the melted toner comes off the base or paper of the printing 22 and deposits on the sheet 44. By observing such a change, it is possible to identify the printing 22 implemented by a toner. To deal with two-sided printings 22, it is preferable to dispose a heater in the press roller 30 in the same manner as in the heat roller 12. If desired, a separator may be located at the outside of the transport path in order to remove the sheet 44 form the printing 22.

Figure 4B:
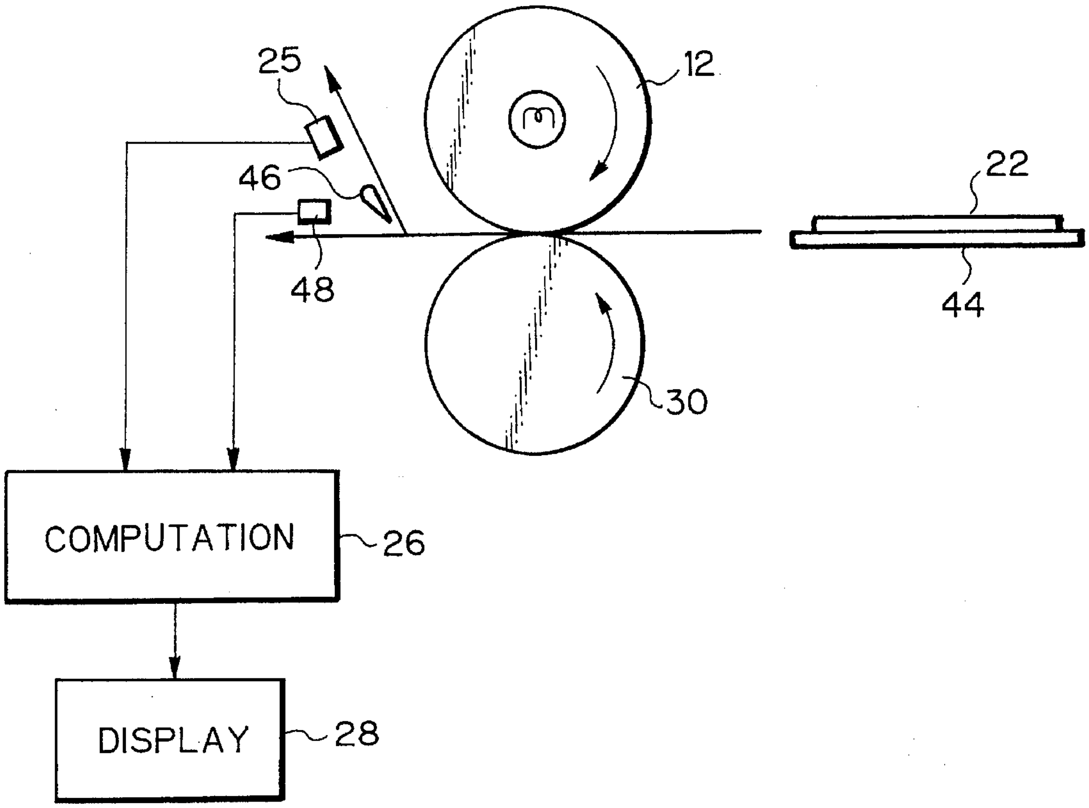
FIG. 4B is a section showing a modification of the fourth embodiment.

FIG. 4B shows an apparatus which detects a change in the density or color of the printing 22 or that of the sheet 44 for the automatic identification. There are shown in the figure a separator 46 for separating the printing 22 from the sheet 44, density sensors 25 and 48 for respectively sensing the densities of the printing 22 and sheet 44 separated from each other, a computation 26 for determining a change in the printing 22 on the basis of the sensed densities or changes thereof, and a display 28 for displaying the result of decision.

5th Embodiment

To identify a printing, this embodiment presses a stamp-like member against a printing for thereby determining whether or not deposits are present. The stamp-like member may advantageously be made of heat-resisting rubber. An arrangement may be made such that when deposits are detected by the stamp-like member, an alert is produced by a lamp or a buzzer. Furthermore, by using the force with which a toner adheres to the heated stamp-like member, it is possible to identify a printing on the basis of the magnitude of the adhering force. This kind of scheme is particularly feasible for securities and stamps.

6th Embodiment

Figure 5:
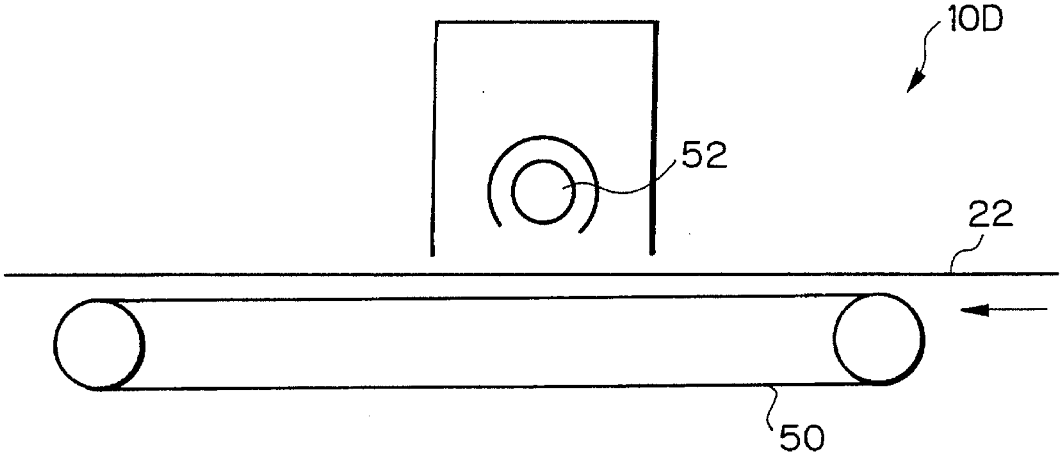
FIGS. 5 and 6 are sections respectively showing a sixth and a seventh embodiment of the present invention.

This embodiment illuminates a printing by an infrared lamp so as to heat it by radiation, and then determines whether or not the printing has changed. Specifically, as shown in FIG. 5, a discriminating apparatus 10D has a belt 50 and an infrared lamp 52. While the printing 22 is conveyed by the belt 50, the infrared lamp 52 illuminates it. Then, the printing is driven out of the apparatus 10D. At this instant, the surface temperature of the printing 22 is controlled to the range of from 50° C. to 250° C. If the printing 22 is implemented by a toner, the toner melts due to the temperature elevation with the result that the resolution of the image is lowered. In addition, when the surface of such a printing 22 is rubbed, an image carried thereon changes. These changes do not occur when it comes to a printing implemented by ink. This embodiment has an advantage that since the lamp 52 heats the printing 22 by radiation, i.e., nothing contacts it, easy maintenance is promoted.

7th Embodiment

Figure 6:
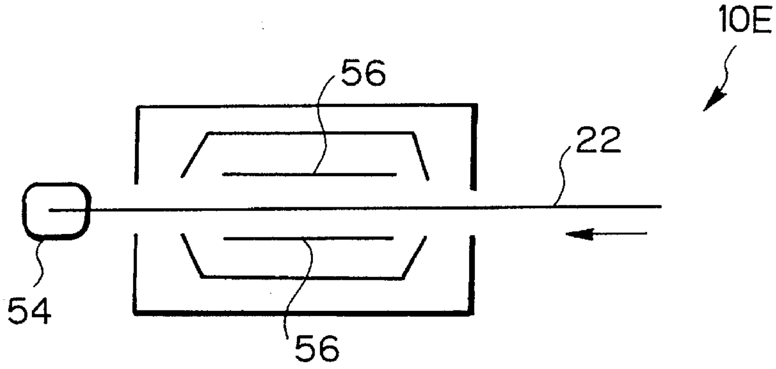
Figure 7A:
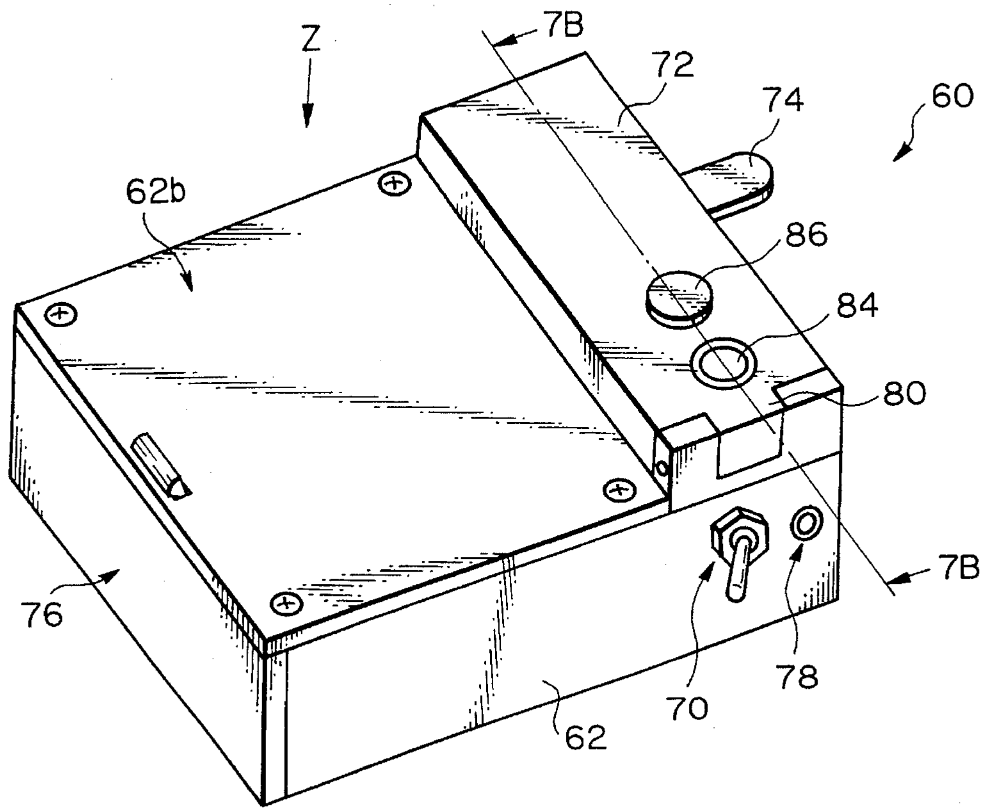
FIG. 7A is a perspective view of an eighth embodiment of the present invention.
Figure 7B:
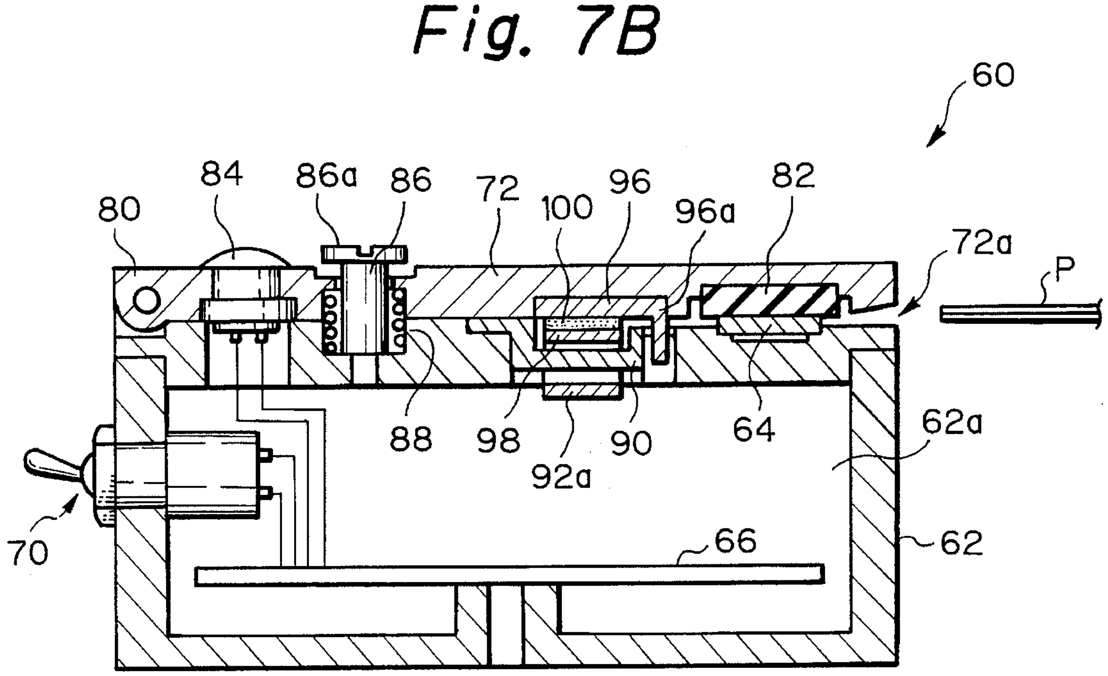
FIG. 7B is a section along line 7B—7B of FIG. 7A.
Figure 7C:
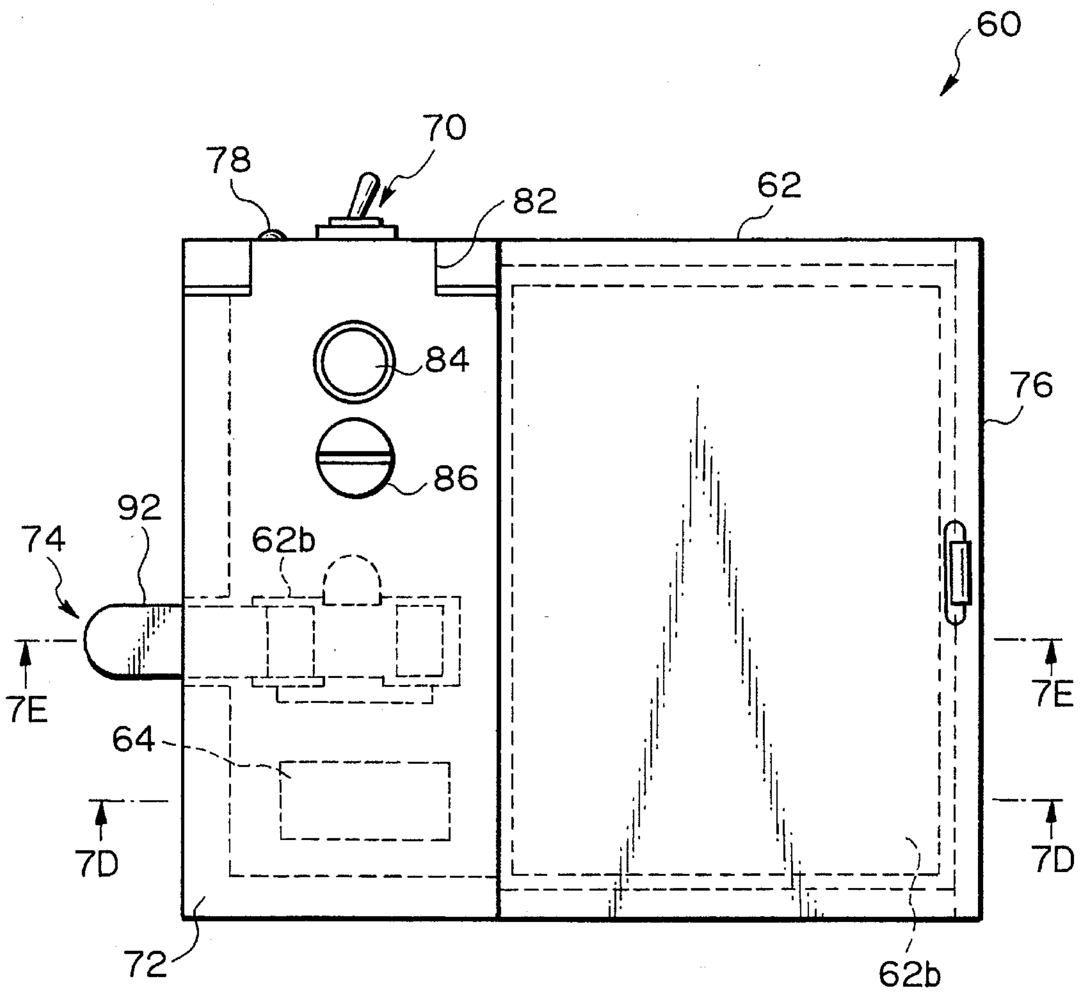
FIG. 7C is a plan view as seen in a direction Z of FIG. 7A.
Figure 7D:
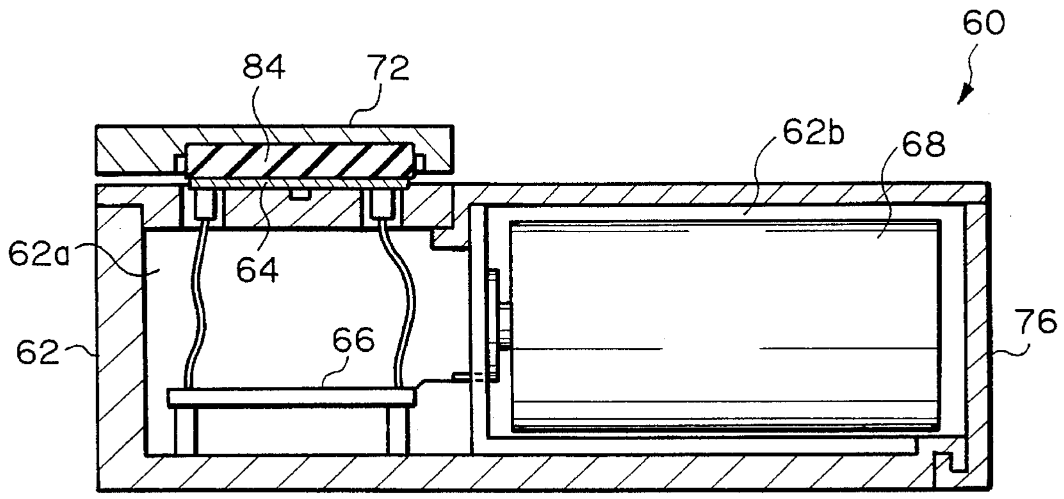
FIG. 7D is a section along line 7D—7D of FIG. 7C.
Figure 7E:
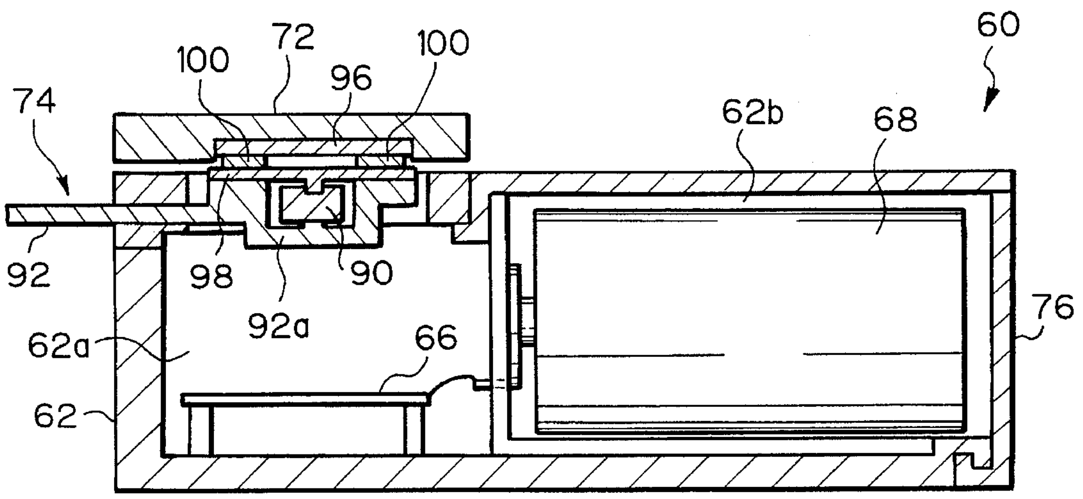

To identify a printing, this embodiment subjects a printing to a high temperature atmosphere so as to heat it, and then determines a change in the printing. Specifically, as shown in FIG. 6, a discriminating apparatus 10E has a gripper 54 for surely gripping the printing 22, and planar heaters 56 for producing a high temperature atmosphere. The printing 22 gripped by the gripper 54 is conveyed into the atmosphere produced by the heaters 56 and heated thereby. Again, the surface temperature of the printing 22 is controlled to the range of from 50° C. to 250° C. Then, as in the sixth embodiment, if the printing 22 is implemented by a toner, the toner melts due to the temperature elevation with the result that the resolution of the image is lowered. In addition, if the surface of the printing 22 is rubbed, the image on the surface changes. However, a printing implemented by ink does not change.

8th Embodiment

Referring to FIGS. 7A through 7E, a discriminating apparatus, generally 60, has a portable casing 60 in the form of a box. A heating member 64 is mounted on the surface of the casing 62. A control circuit board 66 is disposed in the casing 62 for controlling the surface temperature of the member 64 to the range of from 50° C. to 250° C. The control circuit board 66 is powered by a power source via an ON/OFF switch 70. The power source 68 may be implemented by a dry battery or a rechargeable battery. Pressing means is provided for pressing a printing P against the surface of the heating means 64 and is comprised of a plate-like presser 72 and an opening and closing mechanism 74. The presser 72 is rotatably supported by the casing 62 at one end thereof while resting on the surface of the heating member 64 at the other end. The opening and closing mechanism 74 is operable to move the presser 72 into and out of contact with the heating member 64. When the mechanism 74 is closed, it presses the heating member 64.

The casing 62 is partitioned into two compartments 62*a* and 62*b*. The control circuit board 66 is received in the compartment 62*a* while a dry battery, rechargeable battery or similar power source 68 is received in the compartment 62*b*. A cover 76 for covering and uncovering the compartment 62*b* is mounted on the side of the casing 62 overlying the compartment 62*b*, allowing the power source 68 to be replaced with ease. The ON/OFF switch 70 and a pilot lamp 78 are affixed to one side wall of the compartment 62*a*. One end of the presser 72 is connected by a hinge 80 to a lug extending out from the casing 62. Hence, the other end of the presser 72 is rotatable about the hinge 72.

The heating member 64 is implemented by a ceramic heater and located beneath the free end of the presser 72. A piece of elastic rubber 82 is fitted on the surface of the presser 72 that faces the heater 64. An LED 84 is affixed to the presser 72 in the vicinity of the hinge 80 in order to display the energization of the heater 64. A stop 86 is affixed to the upper end of the casing 62 at one end thereof and extends throughout a hole formed in the presser 72. The stop 86 has a flange 86a for defining the movable range of the presser 72. The bottom of the presser 72 and the top of the casing 62 are each formed with a recess around the stop 86. A spring 88 is received in such recesses of the presser 72 and casing 62 while surrounding the stop 86. The spring 88 constantly biases the presser 72 upward to maintain the free end 72*a* thereof in an open position.

As shown in FIG. 7E and FIGS. 8A–8C, the mechanism 74 for opening and closing the presser 72 is accommodated in the rectangular opening 62*b* formed in the casing 62 between the heater 64 and the stop 86. A beam-like support 90 is positioned at the center of the opening 62*b*. A lever 92 has a base portion 92*a*. The base portion 92*a* and a magnetic plate 98 surround the support 90 in a frame configuration. The lever 92 extending from the base portion 92*a* to the outside of the casing 62 is movable up and down by being fulcrumed by the support 90. A magnetic plate 96 is affixed to the bottom of the presser 72 at a position facing the magnetic plate 98. The magnetic plate 96 serves as a paper stop 96*a* at the same time. Permanent magnets 100 are positioned between the two magnetic plates 96 and 98.

Figure 8A:
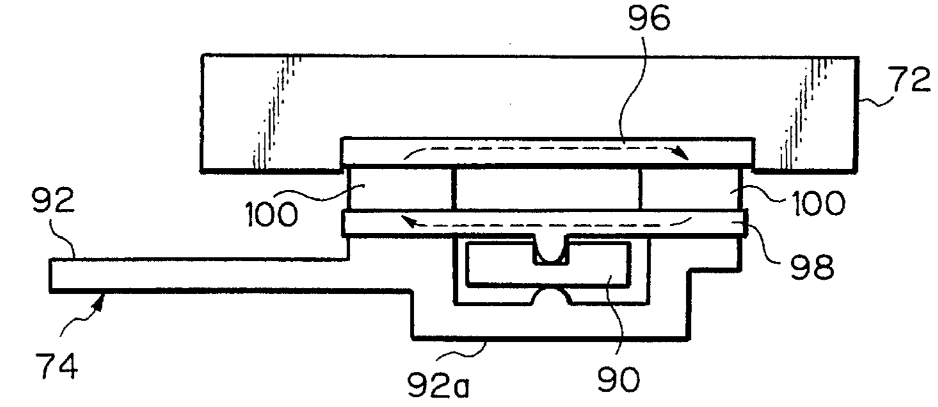
FIGS. 8A—8C are views demonstrating the operation of an opening and closing mechanism included in the eighth embodiment.
Figure 8B:
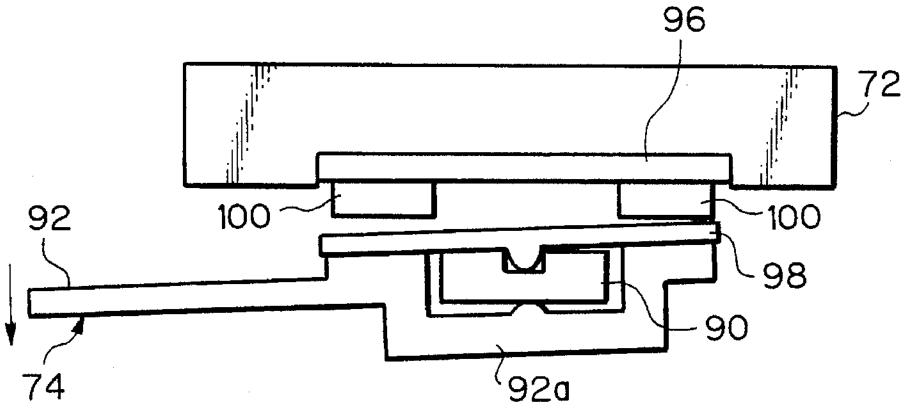
Figure 8C:
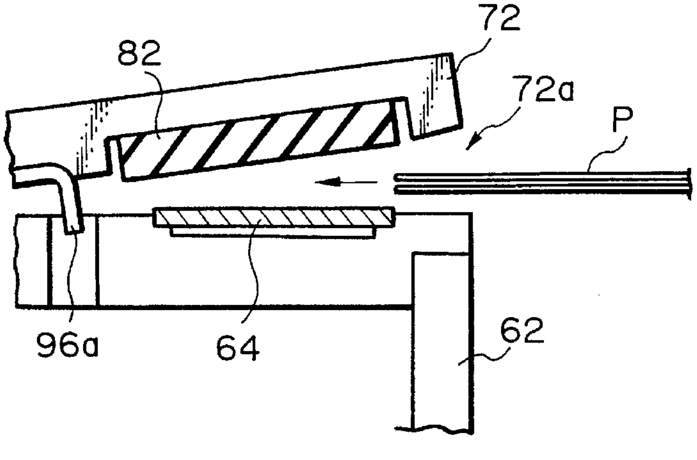

In the above configuration, when the presser 72 is closed, a magnetic circuit is formed by the magnetic plates 96 and 98 and magnets 100, as shown in FIG. 8A. As a result, the magnetic attraction available with the magnets 100 becomes maximum and retains the presser 72 on the casing 62, overcoming the force of the spring 88. As shown in FIG. 8B, when the lever 92 is pressed downward, the magnets 100 and the magnetic plate 98 are spaced apart from each other with the result that the magnetic circuit is interrupted. Consequently, the presser 72 is raised by the spring 88 until it abuts against the flange 86*a* of the stop 86; the free end 72*a* of the presser 72 is opened, as shown in FIG. 8C.

To load the apparatus with a printing P, the operator presses down the lever 92 to open the magnetic circuit, as shown in FIG. 8B. As a result, the free end 72*a* of the presser 72 is opened, as shown in FIG. 8C. Then, the operator inserts the printing P into the space between the presser 72 and the casing 62 until it abuts against the paper stop 96*a*. Subsequently, as the operator restores the lever 92 to the original position, the magnetic circuit is closed, as shown in FIG. 8A. In this condition, the elastic rubber 82 of the presser 72 urges the printing P against the surface of the heater 64. As a result, the printing P is heated by the heater 64.

Figure 9:
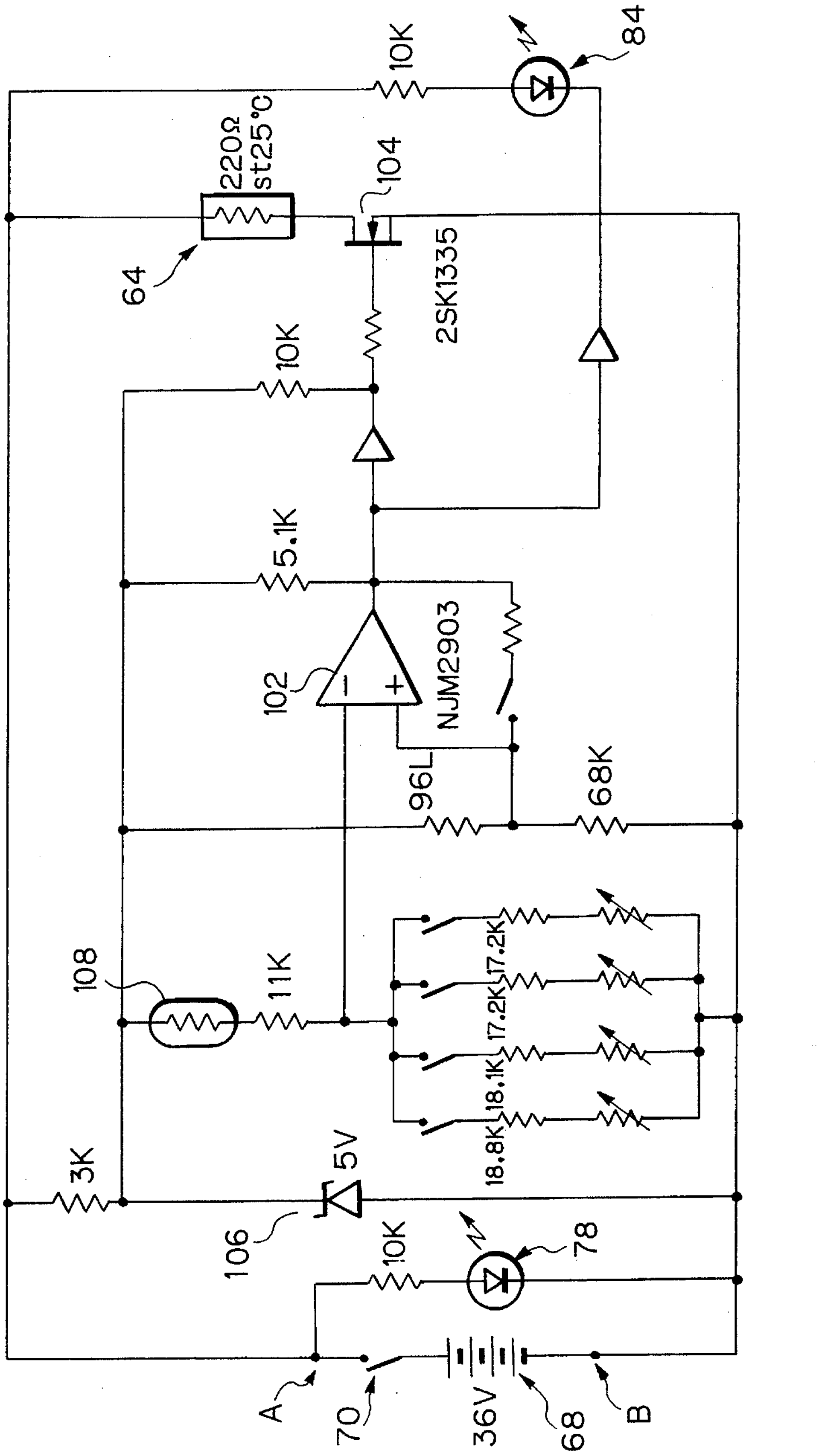
FIG. 9 shows a specific arrangement of heat control circuitry also included in the eighth embodiment.

The heater 64, control circuit board 66, power source 68, switch 70, pilot lamp 78 and LED 84 are electrically connected by, for example, leads to constitute heat control circuitry. When the switch 70 is turned on, the heater 64 is energized and has the surface temperature thereof controlled to above 50° C., but below 250° C. FIG. 9 shows a specific construction of the heat control circuitry. As shown, the circuitry has a comparator 102, an FET (Field Effect Transistor) 104, a diode 106, a thermistor 108 and various resistors in addition to the power source 68, switch 70, pilot lamp 78, LED 84, and heater 64. The constituent parts 102–108 and resistors are mounted on the control circuit board 66.

In operation, when the switch 70 is turned on to energize the control circuit 66, a current flows to the heater 64 to heat it. The control circuit 66 ON/OFF controls the current to the heater 64 so as to maintain the surface temperature thereof in the above-mentioned range. When the heater 64 reaches such a temperature range, the LED 84 turns on. On confirming the turn-on of the LED 84, the operator puts the printing (bill, coupon or similar negotiable paper) P between the elastic rubber 82 of the presser 72 and the heater 64. On the elapse of a predetermined period of time, the operator takes out the printing P to see if the image thereof has changed. This allows the operator to determine easily whether or not the printing is implemented with a toner whose major component is a thermoplastic resin, i.e., whether it is a real negotiable paper or whether it it a copy produced by a color copier.

The printing P may be folded in two and put in the apparatus. Then, if the image of the printing P is formed by a toner whose major component is a thermoplastic resin, the two parts of the folded printing P will stick to each other due to heat. Further, the printing P may be laid on a transparent film or similar sheet; if the image of the printing P is implemented by a toner, it will adhere to the sheet. In any case, whether or not the printing P is a copy can be determined with ease.

With the illustrative embodiment, it is possible to surely identify printings implemented by a toner without regard to the kind of the printings and without resorting to the storage of standard images or comparison. Further, the apparatus is relatively simple in construction and low cost. In addition, since all the constituent parts are packaged in a box and since a power source in the form of a dry battery or a rechargeable battery is used, the apparatus is easy to carry and can be used any time at any place.

9th Embodiment

Figure 10:
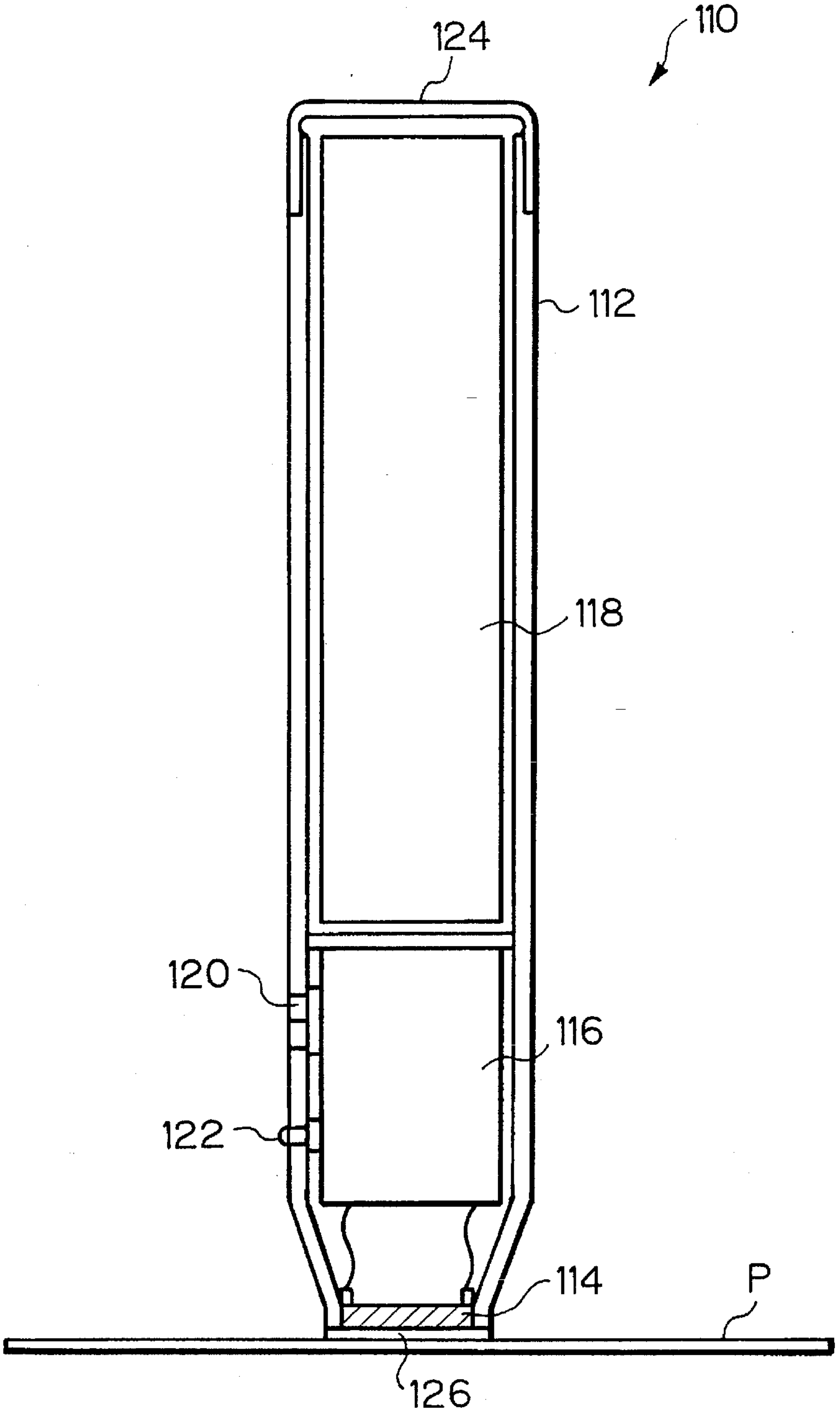
FIG. 10 shows a ninth embodiment of the present invention.

FIG. 10 shows a ninth embodiment of the present invention. As shown, a discriminating apparatus 110 has a hollow cylindrical casing 112 resembling a pencil. One end of the casing 112 is tapered in a truncated cone. A heating member 114 is constituted by a ceramic heater and affixed to the tip of the tapered end of the casing 112 such that the surface thereof appears at the end of the casing 112. A control circuit 116 and a power source 118 are disposed in the casing 112. The control circuit 116 controls the surface temperature of the heater 114 to above 50° C., but below 250° C. A switch 120 is provided on the casing 112 to selectively turn on or turn off the power supply to the control circuit 116. An LED 122 is also provided on the casing 112 to display the condition of the heater 114. The other end of the casing 112 is closed by a removable cap 124. The operator can replace the power source, i.e., dry battery of rechargeable battery 118 easily by removing the cap 124. The surface of the heater 114 is covered with a Teflon coating or similar protective film 126.

The power source 118, control circuit 116, heater 114, switch 120 and LED 122 are electrically connected by, for example, leads to constitute heat control circuitry. While the heat control circuitry may be implemented by the arrangement shown in FIG. 9, any other arrangement is usable so long as it can control the heater temperature to above 50° C., but below 250° C.

In operation, the switch 120 is turned on to heat the heater 114 to the above-mentioned temperature range. Subsequently, the operator holds the casing 112 and presses the surface of the heater 114 against the image surface of the printing P laid on, for example, a desk. Whether or not the printing P is implemented by a toner, whose major component is a thermoplastic resin, can be determined on the basis of a change in the image surface due to heat or deposits on the heater 114. Since all the constituent parts are built in the hollow pencil-like casing 112 and since the power source 118 is constituted by a dry battery or rechargeable battery, the apparatus is easy to carry and can be used any time at any place. In addition, the apparatus with the simple pencil-like casing 112 appears natural.

10th Embodiment

Figure 11A:
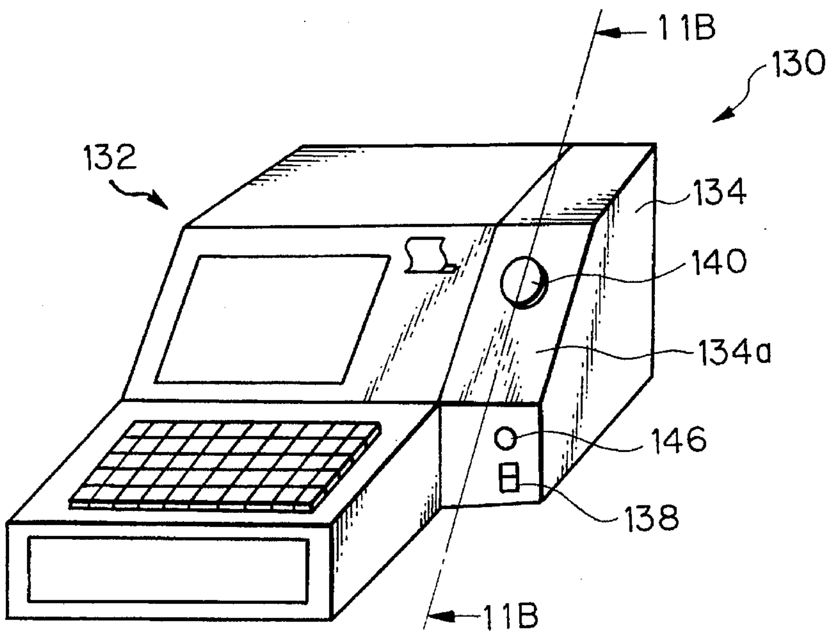
FIG. 11A is a perspective view of a tenth embodiment of the present invention.
Figure 11B:
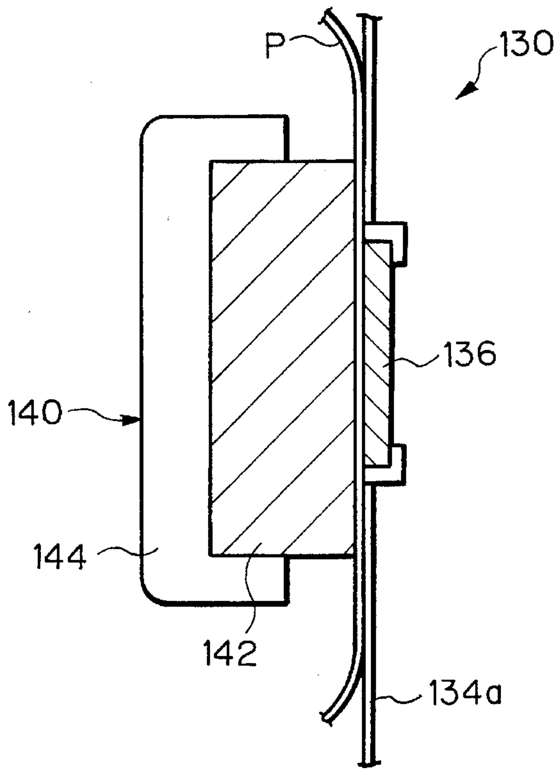
FIG. 11B is a section along line 11B—11B of FIG. 11A.

This embodiment is combined with a cash register or similar equipment. Specifically, as shown in FIGS. 11A and 11B, a discriminating apparatus 130 is constructed into a unit 134 which may be removably mounted on a cash register 132. A planar heater 136 is constituted by, for example, a ceramic heater and affixed to one surface of the unit 134. A control circuit and a power source, which are similar to those of the ninth embodiment, are received in the unit 134. The control circuit controls the heater 136 to a surface temperature above 50° C., but below 250° C. A switch 138 selectively turns on or turns off the power supply to the control circuit. Pressing means is provided for pressing the printing p against the heater 136 and implemented by a presser 140. The presser 140 is attracted onto the casing surface or the unit surface by a magnetic force, thereby pressing the printing P against the heater 136.

At least the surface 134*a* of the unit 134 where the heater 136 is mounted is constituted by a sheet of iron or similar magnetic agent. The heater 136 is fixed in place in an opening formed in the unit surface 134*a*. The presser 140 is made up of a cylindrical permanent magnet 142, and a cap-like thumb piece 144 made of resin or similar material and holding the magnet 142. After the printing P has been put on the heater 136, the presser 140 is urged against the printing P with the result that the printing P is pressed by the magnetic attraction acting between the unit surface 134 and the magnet 142. The LED 146 adjoining the switch 138 indicates whether or not the heater 136 has reached the previously mentioned temperature range.

In operation, after the switch 138 has been turned on to energize the control circuit and the heater 136 has reached a surface temperature ranging from 50° C. to 250° C., the printing P is pressed against the heater 136 by the presser 140. As a result, the printing P is pressed against the heater 136 by the magnetic attraction acting between the presser 140 and the magnet 142. After the printing P has been heated, the presser 140 is removed from the unit 134 to see if the printing P has changed or if deposits are present on the heater 136 and magnet 142. This allows the operator to identify easily whether or not the image of the printing P is formed by a toner whose major component is a thermoplastic resin.

Assume that the unit 134 is installed in a supermarket and combined with the cash register 132, as shown in FIG. 11A. Then, a clerk received a bill, coupon or similar printing P from a customer tacks the printing P on the heater 136 by putting the presser 140 on it. In this condition, the printing P will be heated to a sufficiently high temperature while the clerk operates the register 132, picks up a change out of the register 132, and hands it to the customer. After handing the change to the customer, the clerk can see if the image of the printing P has changed or if any deposit is present on the presser member 140 and magnet. In this way, it is possible for the clerk to identify the printing during ordinary transactions without being noticed by the customer.

The unit 134 is removably mounted on the cash register 132 and can even be used alone. For example, after the service hours of a supermarket, the unit 134 may be brought to a totalizing room in order to identify bills, coupons, etc.

Figure 12A:
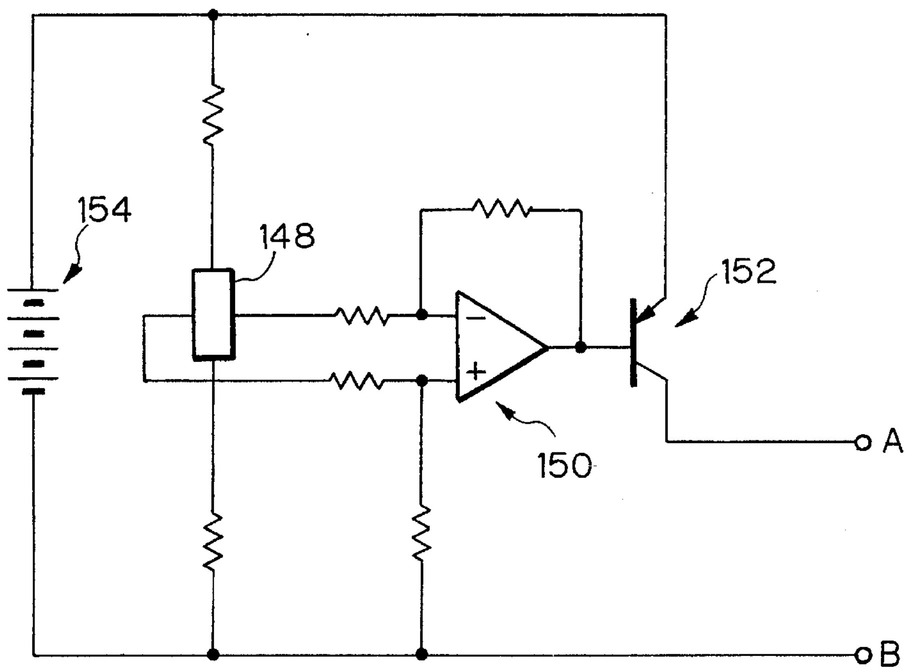
FIG. 12A shows circuitry using a Hall element as switching means included in the tenth embodiment.

In the illustrative embodiment, the switching means for controlling the power supply to the control circuit is implemented by the ordinary manual switch 138. Alternatively, when the means for pressing the printing P against the heater 136 uses magnetic attraction, use may be made of, for example, a Hall element which is responsive to a magnetic field. Then, the power supply to the control circuit will be automatically switched on and off. Specifically, FIG. 12A shows a switching circuit made up of a Hall element 148, an operational amplifier 150, a switching transistor 152, and a power source 154. When this switching circuit is substituted for the switch 70 and power source 68, FIG. 9, intervening between points A and B, the switching transistor 152 will turn on when a magnetic field acts on the Hall element 148. As a result, the power supply to the control circuit is automatically controlled on and off.

Figure 12B:
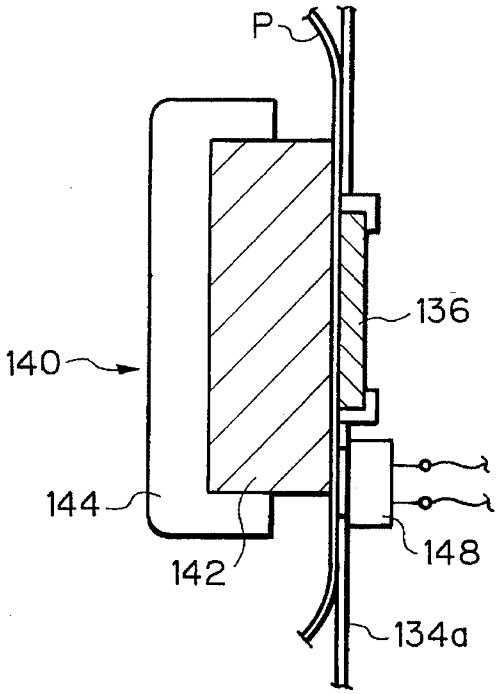
FIG. 12B is a section showing a modification of the tenth embodiment which uses the switching means of FIG. 12A.

When the circuitry shown in FIG. 12A is used, the Hall element 148 may be mounted on the unit 134, as shown in FIG. 12B. As shown, the Hall element 148 is positioned such that it lies in the electric field of the magnet 142 of the presser 140. Specifically, the presser 140 presses the printing P against the heater 136 due to the magnetism of the magnet 142, the magnetic field of the magnet 142 acts on the Hall element 148 to turn on the switching transistor 152. Consequently, the power supply to the control circuit is automatically set up. When the presser 140 is removed from the unit 134, the switching transistor 152 is turned off to automatically interrupt the power supply to the control circuit. The automatic ON/OFF control of the power supply is successful in preventing the operator from forgetting turning on the switch.

In summary, the present invention has various unprecedented advantages, as enumerated below.

(1) Real securities, including bills, coupons and stamps, can be surely discriminated from forged ones produced by a dry process electrophotographic copier without regard to the kind of printings.

(2) It is not necessary to store standard images or to execute comparison. This simplifies the construction and lowers the cost of a discriminating apparatus.

(3) All the constituent parts are built in a casing. This, coupled with the fact that a power source is implemented by a dry battery or rechargeable battery, realizes a discriminating apparatus which is easy to carry and can be used any time at any place.

(4) When the casing is provided with appearance resembling a pencil, seal or stamp, a person can identify printings without being noticed by the others.

(5) When the constituent parts of the apparatus are constructed into a unit which can be combined with, for example, a cash register, a clerk can identify bills, coupons or similar printings received from a customer while operating the register and without making the customer feel uneasy. This successfully eliminates the use of forged securities.

Various modifications will become possible for those skilled in the art after receiving the teachings of the present disclosure without departing from the scope thereof.

What is claimed is:

1. A method of determining whether or not an image printed on a printing is formed by a coloring agent whose major component is a thermoplastic resin, said method comprising the steps of:

(a) heating said printing at a predetermined temperature;

(b) detecting a change in said printing; and (c) determining, based on the detected change of said printing, whether or not the image of said printing is formed by said coloring material.

2. A method as claimed in claim 1, wherein said predetermined temperature in step (a) ranges from 50° C. to 250° C.

3. A method as claimed in claim 1, wherein step (a) comprises (d) causing a contact member heated to said predetermined temperature to contact said printing.

4. A method as claimed in claim 3, wherein step (b) comprises (e) determining whether or not a deposit from said printing is present on said contact member.

5. A method as claimed in claim 4, wherein step (e) comprises (f) sensing a reflection density of a surface of said contact member, and (g) determining whether or not the deposit is present on the basis of the sensed reflection density.

6. A method as claimed in claim 4, wherein step (e) comprises (f) sensing an image density of said printing, and (g) determining whether or not the deposit is present on the basis of the sensed image density.

7. A method as claimed in claim 3, wherein said contact member comprises a single heat roller.

8. A method as claimed in claim 3, wherein said contact member comprises a heat roller and a press roller at least one of which is heated to said predetermined temperature, said heat roller and said press roller being rotatable at a constant speed while pressing against each other.

9. A method as claimed in claim 8, wherein step (b) comprises (e) determining whether or not a deposit from said printing is present on said heat roller.

10. A method as claimed in claim 9, wherein step (e) comprises (f) sensing a reflection density of a surface of said heat roller, and (g) determining whether or not the deposit from said printing is present on the basis of the sensed reflection density.

11. A method as claimed in claim 9, wherein step (e) comprises (f) sensing an image density of said printing, and (g) determining whether or not the deposit is present on the basis of the sensed image density.

12. A method as claimed in claim 8, wherein step (b) comprises (e) detecting said printing wrapping around said heat roller.

13. A method as claimed in claim 8, further comprising (e) causing said printing laid on at least a single sheet to move through between said heat roller and said press roller, and (f) separating said printing from said sheet.

14. A method as claimed in claim 13, wherein step (b) comprises (g) determining whether or not a deposit from said printing is present on said sheet.

15. A method as claimed in claim 14, wherein step (g) comprises (h) sensing a reflection density of a surface of said sheet, and (i) determining whether or not the deposit is present on the basis of the sensed reflection density.

16. A method as claimed in claim 14, wherein step (g) comprises (h) sensing an image density of said printing, and (i) determining whether or not the deposit is present on the basis of the sensed image density.

17. A method as claimed in claim 3, wherein said contact member comprises a stamp-like member.

18. A method as claimed in claim 1, wherein step (a) comprises (d) heating said printing by radiation.

19. A method as claimed in claim 18, wherein step (b) comprises (e) detecting a decrease in a resolution of the image of said printing.

20. A method as claimed in claim 1, wherein step (a) comprises (d) subjecting said printing to an atmosphere of said predetermined temperature.

21. A method as claimed in claim 20, wherein step (b) comprises (e) detecting a decrease in a resolution of the image of said printing.

22. An apparatus for determining whether or not an image printed on a printing is formed by a coloring agent whose major component is a thermoplastic resin, said apparatus comprising:

heating means for heating the printing at a predetermined temperature;

detecting means for detecting a change in the printing heated by said heating means; and decision means for determining, based on the change in the printing, whether or not the image of the printing is formed by said coloring agent.

23. An apparatus as claimed in claim 22, further comprising display means for displaying a result of decision made given by said decision means.

24. An apparatus as claimed in claim 22, wherein the predetermined temperature ranges from 50° C. to 250° C.

25. An apparatus as claimed in claim 22, wherein said heating means comprises a single heat roller capable of rolling on the printing.

26. An apparatus as claimed in claim 25, wherein said detecting means comprises a sensor responsive to a deposit which come off the printing and deposited on said heat roller.

27. An apparatus as claimed in claim 26, wherein said sensor senses at least one of a reflection density of a surface of said heat roller and an image density of the printing.

28. An apparatus as claimed in claim 22, wherein said heating means comprises a heat roller and a press roller at least one of which is heated to the predetermined temperature, said heat roller and said press roller being rotatable at a constant speed while pressing against each other at a predetermined pressure.

29. An apparatus as claimed in claim 28, wherein said detecting means comprises a sensor responsive to a deposit come off the printing and deposited on said heat roller.

30. An apparatus as claimed in claim 29, wherein said sensor senses at least one of a reflection density of said heat roller and an image density of the printing.

31. An apparatus as claimed in claim 28, wherein said detecting means comprises a sensor for sensing the printing wrapping around said heat roller.

32. An apparatus as claimed in claim 28, wherein the printing is laid on at least a single sheet, moved through between said heat roller and said press roller together with said sheet, and then separated from said sheet.

33. An apparatus as claimed in claim 32, wherein said sensor senses, just after the printing has been separated from said sheet, at least one of a reflection density of a surface of said sheet and an image density of said printing.

34. An apparatus as claimed in claim 22, wherein said heating means comprises a stamp-like member for pressing the printing.

35. An apparatus as claimed in claim 22, wherein said heating means heats the printing by radiation, and said detecting means detects a decrease in a resolution of the image of the heated printing.

36. An apparatus as claimed in claim 22, wherein said heating means comprises a planar heater for producing an atmosphere of the predetermined temperature, and said detecting means detects a decrease in a resolution of the image of the printing just after said printing has moved away from said atmosphere.

37. An apparatus for determining whether or not an image printed on a printing is formed by a coloring agent whose major component is a thermoplastic resin, said apparatus comprising:

- a portable casing;
- a heating member mounted on a surface of said casing;
- a control circuit built in said casing for controlling a surface temperature of said heating member to a predetermined temperature;
- a switch for selectively turning on or turning off power supply to said control circuit; and
- pressing means for pressing the printing against a surface of said heating member;
- wherein said pressing means presses the printing against the surface of said heating member to heat said printing to thereby determine at least one of a change in said printing and whether or not a deposit come off said printing and deposited on said heating member is present, and whether or not the image of said printing is formed by said coloring agent is determined on the basis of a result of the above decision.

38. An apparatus as claimed in claim 37, wherein the predetermined temperature ranges from 50° C. to 250° C.

39. An apparatus as claimed in claim 37, wherein said pressing means comprises a flat pressing member hinged to said casing at one end and resting on a surface of said heating member at the other end, and a mechanism for selectively moving said pressing member into or out of contact with said surface of said heating member and exerting a pressure in a closing position.

40. An apparatus as claimed in claim 37, wherein said pressing means comprises a pressing member for pressing the printing against said surface of said heating member by being magnetically attracted onto said surface of said casing.

41. An apparatus for determining whether or not an image printed on a printing is formed by a coloring agent whose major component is a thermoplastic resin, said apparatus comprising:

- a unit capable of being combined with a cash register or similar equipment;
- a heating member mounted on one surface of said unit;
- a control circuit built in said unit for controlling a surface temperature of said heating member to a predetermined temperature;
- a switch for selectively turning on or turning off power supply to said control circuit; and
- pressing means for pressing the printing against the surface of said heating member;
- wherein said pressing means presses the printing against the surface of said heating member to heat said printing to thereby determine at least one of a change in said printing and whether or not a deposit come off said printing and deposited on said heating member is present, and whether or not the image of said printing is formed by the coloring agent is determined on the basis of a result of the above decision.

42. An apparatus as claimed in claim 41, wherein the predetermined temperature ranges from 50° C. to 250° C.

43. An apparatus as claimed in claim 41, wherein said pressing means comprises a pressing member for pressing the printing against the surface of said heating member by being magnetically attracted onto the surface of said unit.

44. An apparatus for determining whether or not an image printed on a printing is formed by a coloring agent whose major component is a thermoplastic resin, said apparatus comprising:

- a tubular portable casing;
- a heating member affixed to one end of said casing such that a surface of said heating member appears at said one end of said casing;
- a control circuit built in said casing for controlling a surface temperature of said heating member to a predetermined temperature; and
- a switch for selectively turning on or turning off power supply to said control circuit;
- wherein the printing is pressed against and heated by the surface of said heating member to thereby determine at least one of a change in said printing and whether or not a deposit come off said printing and deposited on said heating member is present, and whether or not the image of said printing is formed by the coloring agent is determined on the basis of a result of the above decision.

45. An apparatus as claimed in claim 44, wherein the predetermined temperature ranges from 50° C. to 250° C.

* * * * *